United States Patent
Heckelman

[11] 3,805,115
[45] Apr. 16, 1974

[54] BLASTING MACHINE
[75] Inventor: James D. Heckelman, Norwalk, Ohio
[73] Assignee: Research Energy of Ohio, Inc., Cadiz, Ohio
[22] Filed: May 7, 1973
[21] Appl. No.: 357,826

[52] U.S. Cl............. 317/80, 102/28 R, 102/70.2 R, 307/262, 315/230, 320/1
[51] Int. Cl.............................................. F23q 7/02
[58] Field of Search........ 102/28 R, 70.2 R; 317/80; 307/41, 252, 268; 315/163, 230; 320/1; 323/44 R, 77

[56] References Cited
UNITED STATES PATENTS

| | | | |
|---|---|---|---|
| 3,409,804 | 11/1968 | Bankston, Jr. | 317/80 |
| 3,424,924 | 1/1969 | Leisinger et al. | 307/252 |
| 3,470,419 | 9/1969 | Sitler et al. | 317/80 |
| 3,541,393 | 11/1970 | Diswood | 317/80 |
| 3,721,885 | 3/1973 | McKeown et al. | 320/1 |
| 3,752,081 | 8/1973 | McKeown et al. | 102/70.2 R |
| 3,762,331 | 10/1973 | Vlahos | 102/70.2 R |

*Primary Examiner*—Volodymyr Y. Mayewsky

[57] ABSTRACT

A blasting machine comprising a plurality of load condensers which supply energy to respective electronic switches which in turn are connected to respective blast initiating conductors. A pulse generator supplies time spaced signals to all of the electronic switches, and shorting devices are provided on each branch of the signal conductor leading to a respective electronic switch to short out the respective switch until the immediately preceding switch has been actuated and its load condenser has been discharged to its blast initiating conductor. The blasting machine further embodies a battery powered high voltage generator and control circuit which shuts off the signal generator until a predetermined voltage is produced and which shuts off the generator after the predetermined voltage is reached.

11 Claims, 2 Drawing Figures

BLASTING MACHINE

BACKGROUND OF THE INVENTION

The present invention relates to circuitry which will provide pulses to a sequence of separate conductors in such a manner that the pulse on a second conductor is spaced timewise from a pulse on a first conductor by a predetermined interval and a pulse on a third conductor is spaced timewise from the pulse delivered to the second conductor by the same predetermined interval, and so on throughout the sequence of conductors.

More particularly the invention relates to circuitry for sequentially discharging respective ones of a plurality of condensers to respective ones of a plurality of conductors at precisely separated time intervals. Such circuitry has particular advantages in blasting machines wherein the sequence of conductors are connected to respective explosive charges, and the individual conductors of the sequence are energized at precisely spaced apart time intervals.

An object of the present invention is the provision of new and improved circuitry of the above described type comprising: two or more electronic control switches connected to respective conductors to deliver electrical energy thereto, signal generating means of a type which bleeds a regulated voltage through selectable resistors to an electronic switch having a threshold control voltage for turning itself "on" to generate spaced apart pulses, and pulse transmitting circuitry which will actuate sequential ones of said electronic control switches by sequential ones of said spaced apart pulses.

Another object of the invention is the provision of new and improved circuitry of the above described type in which the sequential pulses are blocked from reaching any particular one of the control switches until the immediately preceding control switch has been actuated by one of the pulses.

Another object of the invention is the provision of new and improved circuitry of the immediately above described type wherein a "lockout" switch is provided which prevents all pulses from being delivered by the pulse generator until a predetermined constant voltage is applied to the electronic control switches that in turn supply energy to the load (blasting cap) conductors.

Another object of the invention is the provision of a new and improved power supply for assuring a constant voltage to the load circuitry and which comprises a transformer having a center tapped control winding, a semi-conductor requiring a predetermined voltage on the output of the transformer before passing a current, and a switch controlled by the semi-conductor and which is arranged to remove the bias to the control winding when the switch is energized.

Another object of the invention is a voltage control circuitry of the immediately above described type in which a signal from the voltage control switch actuates another switch which grounds out and disables the biasing circuitry of the "lockout" switch of the pulse generator which prior thereto had shut off the output of the pulse generator.

A further object of the invention is the provision of a "charge" switch which normally shorts out the charging circuit to load condensers until the "charge" switch is actuated.

A further object is the provision of a "fire" switch which normally shorts out the conductors from the load condensers, and also disconnects the pulse generator from the control switches, until the "fire" switch is actuated.

Further objects and advantages of the present invention will become apparent to those skilled in the art to which the invention relates from the following description of the preferred embodiments described with reference to the accompanying drawings forming a part of this specification and in which:

FIG. 1 is a schematic wiring diagram of a DC generator with controlled output voltage and having a battery power supply, and a pulse generator which produces pulses of predetermined duration that are spaced apart by selectable lengths of time; and FIG. 2 is a schematic wiring diagram of one of a plurality of control circuits each of which are adapted to discharge a condenser to its output conductor upon receiving a pulse from the pulse generator, and each of which includes a grounding switch which normally shorts out the pulse transmitting circuitry to the following control circuit until the control circuit in question has discharged its condenser to its output conductor.

DESCRIPTION OF THE PREFERRED EMBODIMENTS

Figure 1:
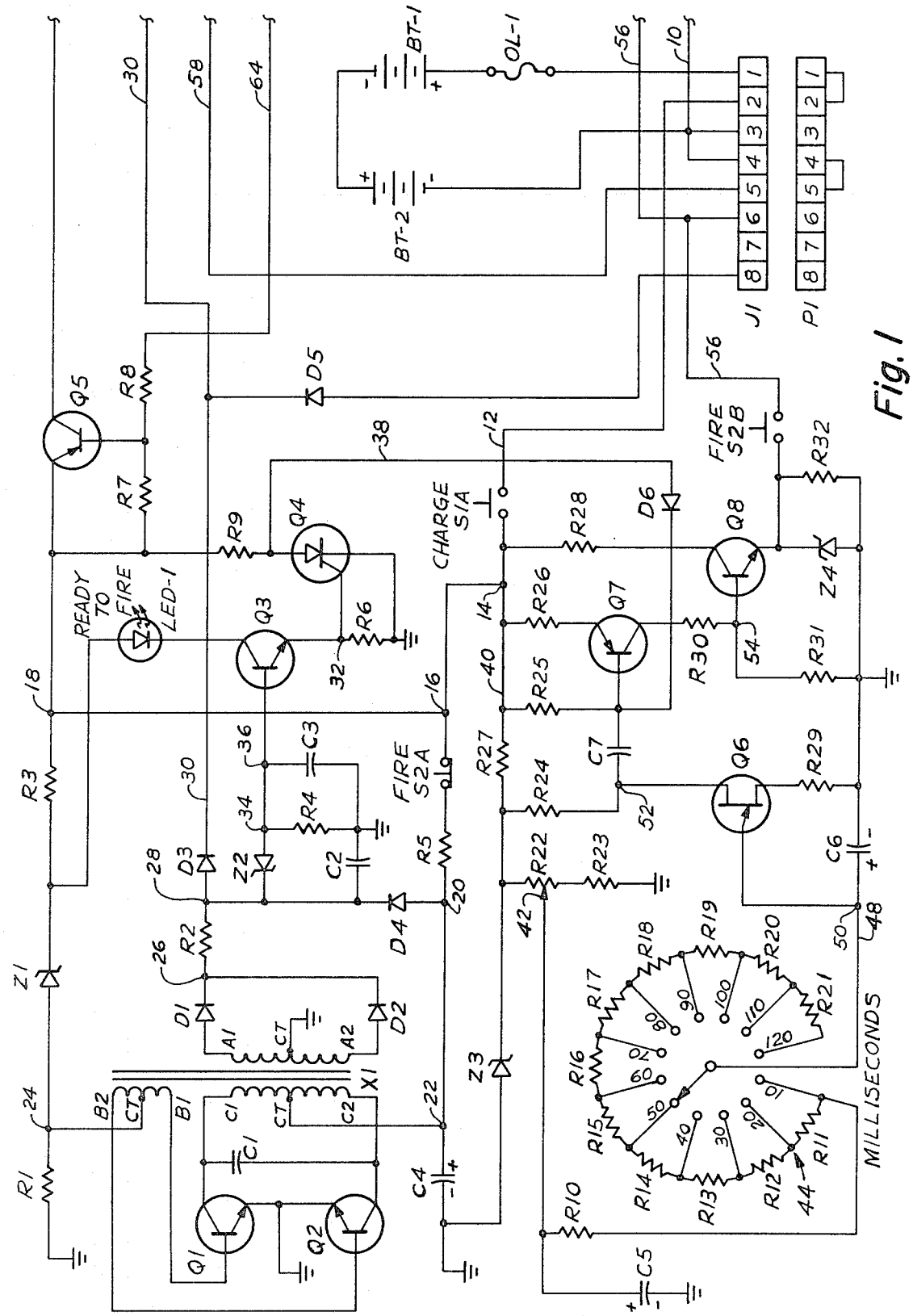

Although the principles of the present invention may be otherwise embodied, they are herein shown and described as embodied in a blasting machine for setting off a plurality of explosive charges at precisely spaced apart time intervals. In order that the terminology used herein will be clearly understood, the term "switch" or "switch means" is used in a broad sense to indicate any type of electronic apparatus having a pair of power terminals and a control terminal that is connected to a control element or gate which when actuated allows energy to flow between the power terminals. Such switch means will include unijunction transistors, transistors, silicon control rectifiers, etc..

Because the blasting machine is to be used in remote areas, its primary source of power comprises two self-contained 7 ½ volt batteries BT1 and BT2 connected in series, with the negative terminal of BT2 connected to terminal 3 of an eight terminal cable socket J1, which in turn is communicated by line 10 to terminal N of cable socket J2, which in turn is grounded. The positive terminal of BT1 is connected to a fuse OL-1 and then to terminal 1 of socket J1 whose corresponding plug P1 is jumpered to pin 2. The receiving terminal for pin 2 in socket J1 is connected by line 12 to the normally open mechanical switch S1A of a two element "Charge" switch S1. The other terminal of S1A is connected to junction 14, whose purpose will later be described, and then to junctions 16 and 18. Junction 16 is connected to a terminal of the "Fire" switch S2A of a mechanical multiple ganged switch S2, and the other terminal is connected to the center tap CT of the primary power winding of a power transformer X1 through resistor R5 and junctions 20 and 22. Junction 22 is connected to ground through condenser C4 to attenuate ripple. Terminal C1 of the primary power winding is connected to the collector of an NPN transistor Q1 and the emitter of Q1 is connected to ground. The other terminal C2 of the primary power winding is connected to the collector of a NPN transistor Q2 whose emitter is connected to ground. Transistors Q1 and Q2 are matching transistors, and a condenser C1 is connected between the collectors of the transistors for the usual reasons, as is understood in the art. The transformer X1 also includes a center tap control winding, the center tap CT of which is adapted to be supplied with voltage from the primary power supply through junction 18, resistor R3, Zener diode Z1 having a breakdown voltage of 6.8 volts, and junction 24. Junction 24 is also connected to ground through resistor R1 which is adapted to deactivate the control winding when the power supply is disconnected from the control winding. The terminal B2 of the control winding is connected to the base of transistor Q2, and the terminal B1 of the control winding is connected to the base of transistor Q1. Because of the slight mismatch due to manufacturing tolerances in transistors Q1 and Q2, more current will flow through one of the transistors than through the other when the power supply is connected to the transformer, and this will start the transistors Q1 and Q2 oscillating. The oscillation of the primary power winding, will of course, produce an oscillating current in the center tapped secondary power winding of the transformer. The center tap of the secondary power winding is connected to ground, and the terminals A1 and A2 of the secondary power winding are connected to diodes D1 and D2, respectively, to produce full wave rectification. The output from diodes D1 and D2 are connected to junction 26, and then through resistor R2, junction 28, and diode D3 to the high voltage bus 30.

It is a feature of the present invention that the blasting machine is capable of properly setting off the charges to which it is connected even though the voltage of the primary batteries has been depleted to 10 volts. The equipment which is connected to the high voltage bus 30 is all designed to operate on 90 volts even though the equipment so far described is capable of producing 120 volts.

It is a further feature of the present invention to prolong the life of the equipment connected to the high voltage bus 30 by shutting off the power supply to the bus 30 whenever the voltage exceeds the nominal 90 volts that is required to satisfactorily operate the circuitry connected to the high voltage bus 30. The voltage limiting function of the present invention is very efficiently accomplished by the voltage regulating circuitry which will now be described.

The voltage regulating circuitry comprises switch Q3 which is an NPN transistor, the collector of which is connected to the primary power supply on the transformer side of R3 through the light emitting diode LED-1. The emitter of switch Q3 is connected to ground through terminal 32 and resistor R6. The base or gate of the switch Q3 is connected to the junction 28 on the high voltage output of the transformer through junctions 34 and 36 and Zener diode Z2. Zener diode Z2 has a breakdown voltage of approximately 90 volts, and when the output voltage of the power transformer exceeds this voltage, positive voltage is applied to the gate of Q3 to actuate the gate and ground out the control winding of the transformer through the light emitting diode LED-1. LED-1 indicates that the necessary voltage has been reached in the equipment to satisfactorily operate all of the blasting circuitry that is connected to the high voltage bus 30. Resistor R4 and condenser C3 communicates junctions 34 and 36 to ground to eliminate any high frequency that might otherwise be applied to the gate of transistor Q3. A condenser C2 is placed between the junction 28 and ground to filter out ripple from the high voltage power supply. Diode D4 is connected between junction 20 of the primary power supply and junction 28 of the high voltage power supply to give a nominal 15 volt boost to the bus 30, and thereby improve the efficiency, and reduce the length of time required to adequately charge the equipment connected to the high voltage bus 30.

The blasting machine of the present invention further comprises and utilizes a timing circuit which generates pulses of predetermined length which are separated by adjustable periods of time to give a total cycle corresponding to the desired spacing between individual and sequential blasts or detonations. It is a further feature of the present invention to provide a "lockout" circuit for the pulse generator which will prevent the control pulses from being transmitted out of the generator to the various blast initiating circuits. This "lockout" circuit operates in conjunction with the voltage regulator circuit above described, and "locks out" the pulse generator until such time as the voltage on the bus 30 has reached the proper voltage for adequately operating the blast circuitry attached to and receiving its energy from the bus 30. The "lockout" circuitry comprises a switch Q4, which is shown as a silicon control rectifier, having its anode connected to the 15 volt power supply at junction 18 through resistor R9. The cathode of the switch Q4 is connected to ground, and the gate of Q4 is connected to the junction 32 that is supplied with the emitter current of Q3 and which in turn is connected to ground through resistor R6. When no current is flowing through the switch Q3, the gate of Q4 will be grounded and the switch Q4 will be nonconducting, so that the nominal 15 volts will exist at the anode of Q4. This nominal 15 volts is transmitted through conductor 38 and diode D6 to the gate, or base, of "switch" Q7 of the pulse generating circuitry which will later be described. The switch Q7 shown is a PNP transistor, and the 15 volts which exist in conductor 38 when switch Q4 is nonconducting is transmitted to the base of Q7 to keep Q7 turned off. However, when Q4 is turned on by reason of the voltage having reached the necessary 90 volts to pass through Zener diode Z2, Q3 and Q4 are turned on, and the voltage at the anode of Q4 drops substantially to zero due to electron flow through the silicon control rectifier Q4. Thereafter positive voltage can no longer be supplied through D6 to the gate of Q7 and this then allows the normal functioning of the pulse generator to take over, and supply its control signal to the gate of Q7. Switch Q7 can then turn on, and operate in its normally intended manner as will later be described. The "lockout" signal provided by the switch Q4, in conjunction with the dual function of the switch Q7, which normally operates as a pulse generating amplifier, performs a unique safety function, which prevents control signals from being transmitted to the later described individual blast circuits before sufficient voltage is supplied to the individual blasting circuits to assure their proper functioning.

The pulse generator of the present invention is also made to operate at a voltage which is less than that which is normally supplied, in order that it will be assured of perfect operation even though a deterioration of the battery or circuit components has occurred. The pulse generator is made to operate at a nominal 9 volts which is produced from the 15 volt power supply by bleed through resistor R27 connected to junction 14, and conductor 40 that is connected to Zener diode Z3 which is in turn connected to ground. Zener diode Z3 has a threshold voltage of 9.1 volts, so that any voltage above this value is bled to ground through the resistor R27. An adjustable amount of this voltage is obtained from the sliding contact 42 of a variable resistor R22 which is connected in series with resistor R23 which in turn is grounded. The adjusted voltage from sliding contact 42 passes through fixed resistor R10 to a 12 contact switch 44 having resistors R11 through R21 respectively connected between respective contacts of the switch 44. A condenser C5 is connected between the sliding contact 42 and ground to take out ripple. The sliding contact 42 of the switch 44 is connected by conductor 48 to junction 50 which in turn is connected both to the control element of a switch Q6 and a storage condenser C6, the other side of which is grounded. The value of R10 is selected so as to give a 10 millisecond delay in charging C6, and each of the resistors R7 through R21 have values to give an additional 10 milliseconds delay for each of the respective resistors, so that when the sliding contact 46 and all of the resistors including R21 are used, a 120 millisecond delay is obtained. Resistors R10 through R21 can also be changed to give other values of delay, if so desired.

Switch Q6 shown in the drawing is a unijunction transistor, and the gate thereof is the emitter. The breakdown, or the threshold voltage of the unijunction transistor is such that when the voltage on the condenser C6 exceeds this voltage, conduction occurs through the base of the unijunction transistor. Base 1 of Q6 is connected to ground through resistor R29, and the base 2 of Q6 is connected to junction 52 which is connected to the 9 volt power supply 40 through resistor R24. Conduction of Q6 produces a negative pulse at junction 52 which is transmitted through condenser C7 to the gate of switch Q7 previously referred to. In the present instance switch Q7 is a PNP transistor, so that the negative pulse from Q6 will turn Q7 on to amplify the signal if D6 anode has been grounded, as previously referred to, by reason of Q4 having been made conductive. Q4 is made conductive, as previously explained, when the voltage in the high voltage bus 30 is above approximately 90 volts. The side of condenser C7 opposite to that which receives the negative pulse from Q6 is connected to the 9 volt conductor 40 through a resistor R25. The emitter of Q7 is also connected to the positive 9 volt conductor 40 through a resistor R26, and the collector of Q7 is connected to ground through resistor R30, junction 54 and resistor R31. Resistors R25 and R26 are so selected as to provide a negative polarity on the base or gate of Q7 by reason of a pulse originating from Q6. Q7 amplifies this pulse, and this pulse is in turn conducted from junction 54 to the gate or base of another switch Q8, which in the present invention is an NPN transistor. The emitter of Q8 is connected through Zener diode Z4 to ground, and the collector of Q8 is connected to the primary power supply junction 14 through resistor R28. Zener diode Z4 is selected to maintain a back voltage of approximately 3.9 volts on the emitter of Q8 when it is conducting, so that a generally square wave shaped pulse is produced on the signal output conductor 56 from the pulse generator. Resistor R32 is connected between the output conductor 56 and ground to assure an immediate drop in voltage after the pulse is transmitted. Signal output conductor 56 contains a second element S2B of the "Fire" switch S2 which is normally open to prevent the signal from being transmitted to the charge detonating circuits, later to be described, until such time as the "Fire" switch is depressed.

Socket J1 is used to provide a quick coupling for a battery charger, and for a circuit tester, which will not herein be described. Signal output conductor 56 is connected to terminal 6 of socket J1. Terminal 5 of socket J1 is connected to a second element S1B of the ganged "Charge" switch, and pins 4 and 5 of plug P1 are interconnected to ground terminal 5 to terminal 4 through ground line 10.

Figure 2:
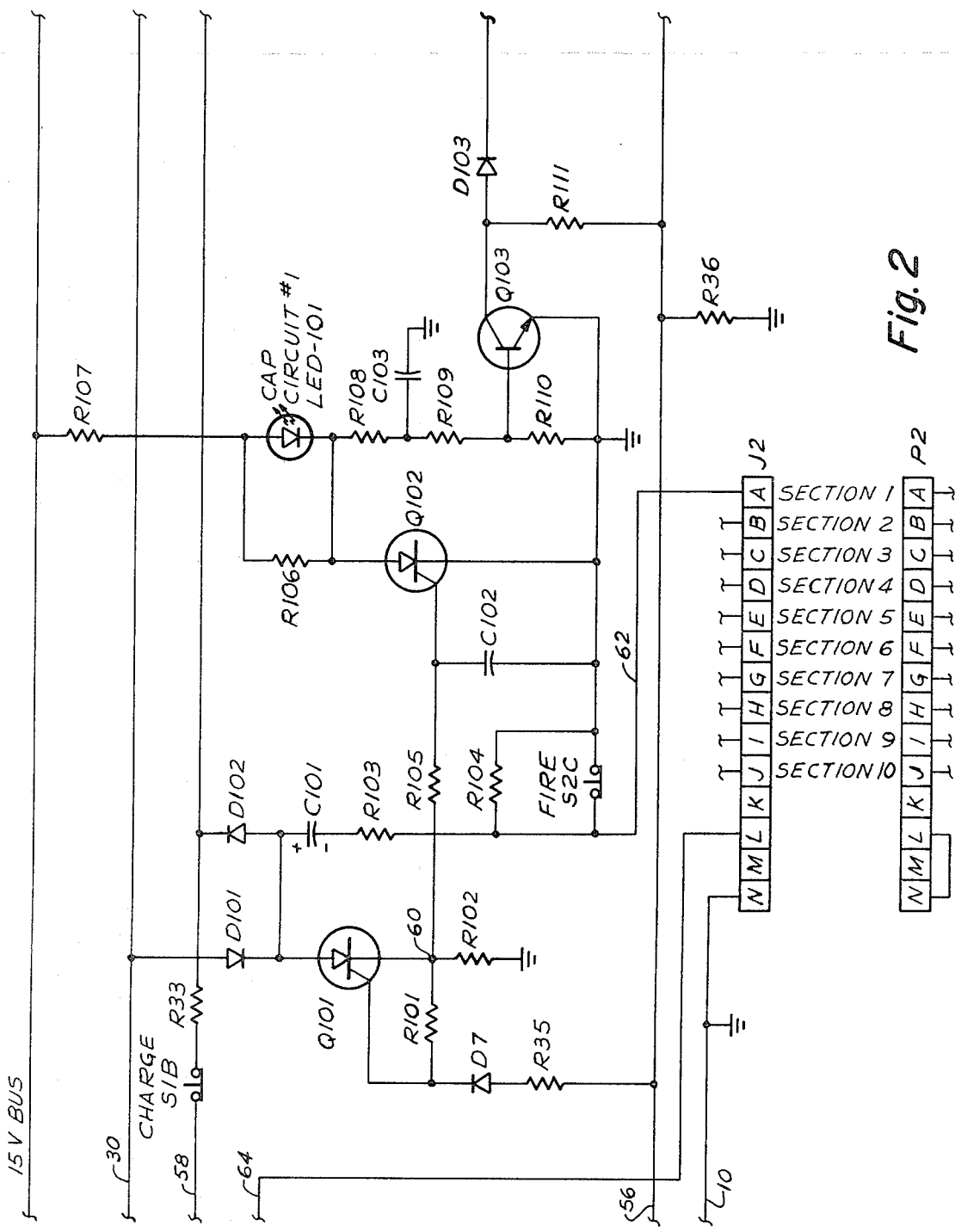

It is a feature of the present invention that the blasting machine utilizes a control pulse generated by the charging and discharging of a single circuit, as opposed to a plurality of different circuits, so that the spacing between control pulses will be substantially identical and thus very accurate. This control pulse is communicated by signal output conductor 56 to a plurality (usually 10 or more) of substantially identical cap igniting conductors, one of which 62 is shown in FIG. 2 of the drawings. FIG. 2 of the drawings shows the first section (Section 1) of ten sections, and section 1 is the first to receive the pulses from the pulse generator.

Once the "Charge" switch S1 has been depressed, and the light LED-1 is lighted to indicate high voltage, the "Fire" switch S2 is depressed. A train of pulses at a predetermined spacing is delivered to the signal output conductor 56, which train of pulses is delivered to an electronic control switch Q101, which in the present instance is the gate of a silicon control rectifier, through resistor R35 and diode D7. A stabilizing resistor R36 is connected between the signal output conductor 56 and ground to assure that the voltage will drop appreciably in the conductor 56 after each pulse is transmitted. The anode of Q101 is connected to the high voltage bus 30, through diode D101, and the cathode of Q101 is connected to ground through junction 60 and a one ohm resistor R102. One side of a power storage or detonating condenser C101 having more than sufficient capacity to ignite a blasting cap is connected to the discharge of diode D101, while the other side of the condenser C101 is connected to ground through resistor R103 and the normally closed switch S2C of the "Fire" switch S2. A full 90 volts, therefore, is slowly accumulated on the condenser C101, and the corresponding condensers of the other nine blasting sections, provided that the "Charge" switch S1 has been depressed. One of the safety features of the present invention is that the power storage condensers, and all of the other power condensers are prevented from accumulating a charge prior to the time that the "Charge" switch S1 is depressed. This safety feature is accomplished by means of the normally closed switch element S1B which is connected to negative bus 58 and which in turn is communicated through a load resistor R33 to the individual blasting circuits. A diode D102 communicates negative bus 58 to the positive terminal of C101 to in effect short out the condenser C101 through the load resistor R33 until such time as the "Charge" switch is depressed. The resistor R103 on the negative side of the condenser C101 is in turn connected by conductor 62 to the terminal A of the cable connector socket J2, and to which terminal the line leading to the first of the series of caps that are to be detonated, is connected.

It will now be seen that the switch element S2C provides the highly desirable safety feature of shorting out the cap detonating line until such time as the "Fire" switch is depressed. A resistor R104 is in parallel with the "Fire" switch element S2C to slowly dissipate the charge on the condenser C101 if for some reason an open circuit or very high resistance exists in the cap detonating circuit at the time that the "Fire" switch S2C is opened. The first pulse delivered to Q101 therefore allows electrons from the condenser C101 to pass through the cap to ground and back through Q101 to the anode of condenser C101 to dissipate the energy in the condenser and ignite the cap. This flow of current produces a positive voltage at the junction 60, which in turn is passed through resistor R105 to the gate of a signal transfer switch Q102, which in the present instance is also a silicon control rectifier.

The cathode of Q102 is connected to ground and the anode of Q102 is connected through resistor R106 and resistor R107 to a 15 volt bus that is connected to the 15 volt power junction 18 through switch Q5, which is a PNP transistor. The base of Q5 is connected through resistor R8 and conductor 64 to terminal L of socket J2, and a plug, not shown, is used to jumper terminals L and N to ground when a sequential operation of the blasting circuits is desired. Conductor 64, therefore, will normally bias Q5 "on," so that the 15 volts at terminal 18 is normally communicated to the anode of switch Q102. A resistor R7 is connected between the base of Q5 and the power terminal 18 to limit the bias that is delivered to the base of Q5 by the grounding of conductor 64. The positive 15 volt power supply from resistor R107 is also communicated through resistor R106, resistor R108 and resistor R109 to the gate of a shorting switch Q103, which is shown as an NPN transistor. The emitter of the transistor is communicated to ground, while the collector of the transistor Q103 is connected through a diode D103 to the gate of a switch or silicon control rectifier Q201 of the second section, not shown, but which corresponds to Q101. The signals from the pulse generator are also transmitted from the signal output conductor 56 to the gate of the second stage switch Q201 through resistor R111, which corresponds in value to R35, and the diode D103, which is similar to the diode D7. A resistor R110 communicates the base of Q103 to ground so that a positive bias with respect to its emitter is normally maintained upon the switch Q103 to short out the signal that is transmitted to the gate of the second section of cap igniting circuits until such time as C101 has properly fired.

As previously indicated, the firing of C101 produces a pulse on the gate of Q102 (if the current discharge by C101 has been greater than a predetermined value) which switches Q102 on. A light emitting diode LED-101 is placed in parallel with resistor R106, so that when Q102 is turned on, the cathode of the light emitting diode LED-101 is grounded, and sufficient current flows through LED-101 to produce a light which indicates that C101 has been discharged. A condenser C102 is connected between the gate of Q102 and ground to produce a delay in the actuation of Q102 for such period of time as assures that an adequate charge has been transmitted from C101 to the cap circuit to ignite the cap. In addition to lighting LED-101, the actuation of Q102 grounds out the gate of Q103, which is normally "on," to turn Q103 off, so that the next pulse which is experienced in the signal output conductor 56 will no longer be shorted out and will in fact trigger the control gate of switch Q201 of the immediately following section that is connected to signal output conductor 56. A condenser C103 communicates the junction of resistors R108 and R109 to ground to provide a minimum delay for the actuation of Q103, which minimum delay is longer than the pulse duration. This assures that the second section does not become triggered by the same pulse which triggered Q101.

With the exception of switch S1B, resistor R33, resistor R35, and diode D7, the remaining circuitry shown in FIG. 2 will be exactly duplicated for each section that is connected to the signal output conductor 56 other than the last section. The last section will be the same as the second section just described, excepting that no shorting out switch comparable to Q103 and accompanying circuitry corresponding to R108, R109, R110, R111, condenser C103 and diode D103 is required.

As previously explained, the cap igniting conductor 62 for the first detonation section is connected to terminal A of the socket J2 of a cable connector, and terminals B through J of socket J2 are similarly connected to their respective detonating sections 2 through 10. The plug P2 of the cable connector has its terminals A' through J' adapted to engage the respective terminals A through J of the socket J2, and has its terminals L' and M' jumpered. When plug P2 is utilized, therefore, the base of Q5 is automatically grounded to turn Q5 "on," to thereby assure sequential operation of the blast sections 1 through 10.

It will now be seen that the individual sections of the cap firing circuitry effectively "cascade" the control signal from the pulse generator from one section to another without the signal passing through the preceding section. In the present invention the control signal is transmitted simultaneously to all sections, but "lock-out" means or "shorting" means are provided which disable the control signal on all downstream sections until the section immediately upstream to the section in question has successfully fired. It will further be seen that a mechanical firing switch is provided of a type which grounds out each individual cap firing conductor until such time as the "Fire" switch is actuated. One of the elements of the same switch disconnects the control signal of pulse generator from the cap firing sections until the same "Fire" switch is actuated. The "Charge" switch also has an element which grounds out all of the firing condensers until such time as the "Charge" switch is actuated to charge the condensers immediately before firing. It will further be seen that the high voltage circuitry for the power transformer will have many applications other than in blasting machines, as will the disabling circuit for disabling the pulse generator prior to the time that a proper voltage has been generated by the power transformer. The arrangement of using sequential signals from the pulse generator to sequentially turn on a plurality of sections of other circuitry also will have many applications other than in a blasting machine; and the individual sections and "cascading" arrangement will likewise have many applications other than in blasting machines.

While the invention has been described in considerable detail, I do not wish to be limited to the particular embodiments shown and described, but it is my intention to cover hereby all novel adaptations, modifications, and arrangements thereof which come within the

I claim:

1. A blasting machine comprising: first and second detonating condensers, first and second cap igniting conductors communicating with a side of respective condensers, first and second control switches having power terminals respectively connected between the other side of respective detonating condensers and ground to provide discharge circuits for respective condensers, a spaced apart pulse generator connected to the control terminals of both control switches, a shorting switch with power terminals communicating the control element of said second control switch to ground when energized, resistance having means normally energizing said control element of said shorting switch to normally hold said second control switch off, and signal transfer means communicating the discharge circuit of said first condenser to said resistance having means connected to said control terminal of said shorting switch to turn said shorting switch off.

2. The blasting machine of claim 1 including a delay condenser between ground and said resistance having means to delay turning said shorting switch off when said first detonating condenser discharges.

3. The blasting machine of claim 1 including: a normally closed "charge" switch means grounding the positive side of said detonating condensers until the switch means is actuated, and normally closed "fire" switch means grounding out said cap igniting conductors until the "fire" switch means is actuated.

4. The blasting machine of claim 3 including: a delay condenser between said signal transfer means and ground to delay signal transfer until said first detonating condenser has delivered a generally predetermined amount of energy to said first cap igniting conductor.

5. The blasting machine of claim 3 wherein: said signal transfer means comprises: a signal transfer switch with power terminals communicating ground to said resistance having means which normally energizes the control element of said shorting switch, the control element of said signal transfer switch receiving its signal from said discharge circuit of said first detonating condenser, and a delay condenser grounding the control element of said signal transfer switch to delay its actuation until a generally predetermined quantity of energy has been discharged by said first detonating condenser to said first cap igniting conductor.

6. The blasting machine of claim 5 including signal means which indicate when said signal transfer switch has been actuated.

7. The blasting machine of claim 6 including a second condenser grounding said control element of said shorting switch to give a time delay to the operation of said shorting switch after said signal transfer switch has been actuated.

8. The blasting machine of claim 7 wherein said signal generating means provides pulses whose duration is less than the delay provided by said second delay condenser and provides spacing between pulses that are greater than the total delay provided by said first and second delay condensers.

9. The blasting machine of claim 3 wherein said "fire" switch means includes an element which normally disconnects said pulse generator from said control switches until said "fire" switch means is actuated.

10. A sequential blasting machine comprising: first and second detonating condensers; first and second cap igniting conductors communicating with a side of respective condensers; first and second control switches having power terminals respectively connected between the other side of respective detonating condensers and ground to provide discharge circuits for respective condensers; a shorting switch with power terminals communicating the control element of said second control switch to ground when energized; a power supply; resistance having means communicating said power supply to said control element of said shorting switch; signal transfer means communicating the discharge of said first condenser to said resistance having means to turn said shorting switch off after said first detonating condenser has discharged; a third control switch having a control terminal, and power terminals in series circuit with said power supply and said resistance having means; and a control circuit for providing sequential or simultaneous firing of said detonating condensers, said control circuit including a resistor and an on-off device in series between said power supply and ground with the control terminal of said third control switch being connected to the portion of said control circuit between said resistor and said on-off device.

11. The blasting machine of claim 10 wherein said on-off device comprises: a first half of a multi-terminal cable connector some of the terminals of which are connected to respective detonating condensers, another terminal of which is connected to ground, and another terminal of which is connected to said resistor; and a second half of said multi-terminal cable connector some terminals of which engage said respective terminals of said first half which are connected to said detonating condensers, said second half also containing a jumper between said terminals of said first half which contact said grounded terminal and resistor connected terminal; and whereby the connection of said two halfs of said cable connector automatically provides sequential operation of said blasting machine.

* * * * *